(12) United States Patent
Bastiaens et al.

(10) Patent No.: US 6,462,859 B1
(45) Date of Patent: Oct. 8, 2002

(54) ELECTROMAGNETICALLY RESPONSIVE PARTICLE ASSEMBLY AND METHODS AND ARTICLES FOR MANUFACTURE AND USE

(75) Inventors: Willem V. Bastiaens, Medina; Rolf W. Biernath, Wyoming, both of MN (US); Mark P. Dolan, Hudson, WI (US); Lori P. Engle, Little Canada, MN (US); Patrick R. Fleming, Lake Elmo, MN (US); Robert J. Wolf, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 52 days.

(21) Appl. No.: 09/678,191

(22) Filed: Oct. 4, 2000

(51) Int. Cl.[7] .................. G02B 26/00; G02B 26/08; G09G 3/34; B32B 5/16

(52) U.S. Cl. .................. 359/296; 359/298; 345/107; 428/323; 428/331

(58) Field of Search .................. 359/296, 298; 345/107; 428/323, 331, 327, 402, 407, 375, 688

(56) References Cited

U.S. PATENT DOCUMENTS

| 4,126,854 A | 11/1978 | Sheridon | 340/373 |
|---|---|---|---|
| 4,438,160 A | 3/1984 | Ishikawa et al. | 427/214 |
| 5,604,027 A | 2/1997 | Sheridon | 428/323 |
| 5,754,332 A | 5/1998 | Crowley | 359/296 |
| 5,808,783 A | 9/1998 | Crowley | 359/296 |
| 5,815,306 A | 9/1998 | Sheridon et al. | 359/296 |
| 5,914,805 A | * 6/1999 | Crowley | 359/296 |
| 6,017,584 A | 1/2000 | Albert et al. | 427/213.3 |
| 6,038,059 A | 3/2000 | Silverman | 359/296 |
| 6,122,094 A | 9/2000 | Silverman | 359/296 |
| 6,128,124 A | 10/2000 | Silverman | 359/296 |
| 6,162,321 A | 12/2000 | Silverman | 156/276 |

FOREIGN PATENT DOCUMENTS

| EP | 0 783 163 | 7/1997 | G09F/9/37 |
|---|---|---|---|
| EP | 0 994 455 | 4/2000 | G09F/9/37 |
| JP | 05 061075 | 3/1993 | G02F/1/167 |
| WO | WO 96/33839 | 10/1996 | |
| WO | WO 98/03896 | 1/1998 | |
| WO | WO 99/10767 | 3/1999 | |
| WO | WO 99/53373 | 10/1999 | |
| WO | WO 99/60554 | 11/1999 | |
| WO | WO 00/65629 | 11/2000 | |

OTHER PUBLICATIONS

Micheletto, R. et al., "A Simple Method for the Production of a Two–Dimensional, Ordered Array of Small Latex Particles", *Langmuir*, vol. 11, No. 9, pp. 3333–3336 (Sep. 1995).

\* cited by examiner

*Primary Examiner*—Georgia Epps
*Assistant Examiner*—Timothy Thompson
(74) *Attorney, Agent, or Firm*—Bruce E. Black

(57) ABSTRACT

Assemblies containing a substrate with pockets for electromagnetically responsive particles can be made for a variety of uses, including, for example, display media, lenses, and color-changing fabric. The arrangement of these pockets can be selected to provide higher particle density than previously realized. The assembly includes an assembly substrate, particles, and a top coat layer.

30 Claims, 12 Drawing Sheets

ELECTROMAGNETICALLY RESPONSIVE PARTICLE ASSEMBLY AND METHODS AND ARTICLES FOR MANUFACTURE AND USE

FIELD OF THE INVENTION

The present invention is directed generally to an electromagnetically responsive particle assembly, and more specifically to a particle assembly having pockets incorporating electromagnetically responsive particles and methods of manufacturing and using the particle assembly.

BACKGROUND OF THE INVENTION

A variety of products can be made using assemblies (e.g., films, membranes, structures, or other constructions) having electromagnetically responsive particles. Such products include display media, color-changing fabrics, lenses, etc. These assemblies utilize the movement (e.g., rotation or translation) of electromagnetically responsive particles under the influence of an applied electromagnetic field to display information, change color of the assembly, etc. In one approach to fabricating such a particle assembly, bichromal electromagnetically responsive particles rotate under the application of an electromagnetic field to orient one of two colors of the particle's surface in a viewing direction. The particular color that is oriented towards the viewing direction is dependent on the polarity of the applied electromagnetic field. In a number of applications, the bichromal particles are spherical in shape and are suspended in a dielectric liquid or in a film matrix between two plates.

The full potential of this and other approaches for fabricating assemblies (e.g., films) for flat displays and other applications has not yet been realized. The existing devices suffer from low contrast and low resolution. These devices typically include multiple layers of particles or have particles that are not reliably disposed in optimal packing configurations. In addition, the devices produced to date are thick, thus requiring large operating voltages to produce a sufficiently large electromagnetic field to activate the electromagnetically responsive particles.

SUMMARY OF THE INVENTION

Generally, the present invention relates to assemblies containing a substrate with pockets for electromagnetically responsive particles. An arrangement of these pockets can be selected to provide higher particle density than previously realized. One embodiment is an assembly including an assembly substrate and electromagnetically responsive particles. The assembly substrate defines one or more substantially enclosed, fluid-containing cells. Each cell includes pockets in fluid communication with each other. Each pocket is defined by the assembly substrate to hold at least one electromagnetically responsive particle within the pocket.

Another embodiment is an assembly that includes an assembly substrate, particles, and a top coat layer. The assembly substrate defines pockets in the assembly substrate. Each pocket of the assembly substrate corresponds to a pocket formed by ablation of a polymer film. The particles are disposed in the pockets of the substrate and each of the particles is responsive to an applied electromagnetic field to control a state (e.g., a position or orientation) of the particle in the substrate. The top coat layer is disposed over the particles and the substrate.

Yet another embodiment is an assembly having an assembly substrate defining pockets, particles disposed in the pockets, and a first dielectric fluid. Each pocket of this assembly has, on average, at least two of the particles. The particles are colored and are responsive to an applied electromagnetic field to control a state of the particle in the substrate. The first dielectric fluid has a color different than the particles and is disposed in at least a subset of the pockets. Optionally, other dielectric fluids with colors different than the first dielectric fluid and the particles can be disposed in other subsets of the pockets. In addition, the pockets may each contain 25 or more particles.

These assemblies can be used to form a variety of products including, for example, display media (such as thin, portable electronic displays or "electronic paper"), traffic and other signage, fabrics (e.g., camouflage or color-changing fabric), lenses, films, roofs (e.g., color changing roofs for decorative or energy absorbing/reflecting purposes), and other products. The particles can be, for example, bichromal particles (e.g., particles with different colored hemispheres), single-colored particles, particles with more than two colors, reflective particles, transparent or translucent particles, particles with a different index of refraction than the assembly substrate, top coat layer, or dielectric fluid around the particles, or particles with transmissive windows. The pockets can be formed in a variety of regular and irregular patterns including, for example, hexagonal or cubic close packed patterns. Assemblies can be formed where the pockets have, on average, about one particle per pocket. Other assemblies can be formed where the pockets have, on average, two or more particles per pocket and, typically, 25 or more particles.

Another embodiment is a method of making an assembly. A polymer film is irradiated to remove a portion of the polymer film by ablation and produce pockets in the polymer film. An assembly substrate with pockets is formed using the polymer film, the pockets of the assembly substrate corresponding to the pockets in the polymer film. Particles are disposed in the pockets of the assembly substrate. Each of the particles is responsive to an applied electromagnetic field to control a state of the particle in the substrate. Finally, a top coat layer is disposed over the particles and at least a portion of the assembly substrate.

This method can be used to form any of the assemblies described above. In some instances, the polymer film is used as the assembly substrate. In other instances, the polymer film is used as a mold from which the assembly substrate is formed.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
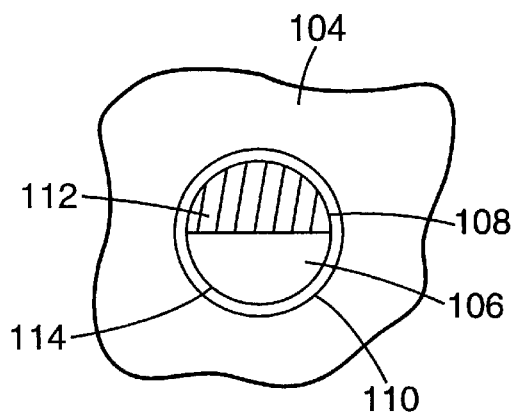
FIG. 1A schematically illustrates one embodiment of an electromagnetically responsive particle in an assembly substrate.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is applicable to an assembly in which electromagnetically responsive particles move in response to the application of or change in an electromagnetic field. The present invention is particularly applicable to assemblies for information display such as, for example, display media (such as thin, portable electronic displays or "electronic paper") and traffic or other signage. Information that can be displayed includes, for example, alphanumeric characters, symbols, drawings, artwork, pictures, graphics, floor graphics, video signals, and other representations that can convey meaning or expression (e.g., artistic expression) to a user or viewer of the display media. The present invention is also applicable to assemblies for color-changing and other applications including, for example, fabrics (e.g., camouflage or color-changing fabric), lenses, films, roofs (e.g., color changing roofs for decorative or energy absorbing/reflecting purposes), airplane skins, abrasives, medical devices (e.g., temperature sensors), decorative coverings (e.g., wallpaper, carpets, rugs, and tapestries), and other products. The present invention is particularly suited for uses that require high contrast, high resolution, low operating voltage, or combinations of these characteristics.

Electromagnetically Responsive Particles

Figure 1B:
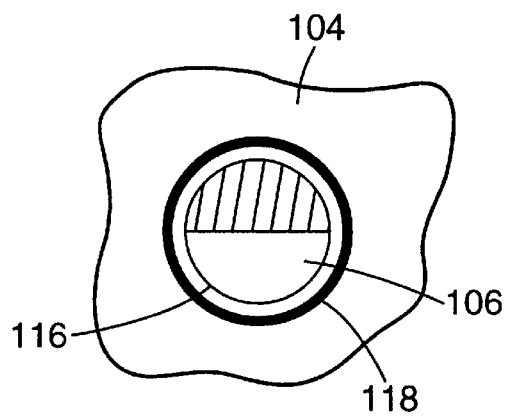
FIG. 1B schematically illustrates another embodiment of an electromagnetically responsive particle in an assembly substrate.
Figure 1C:
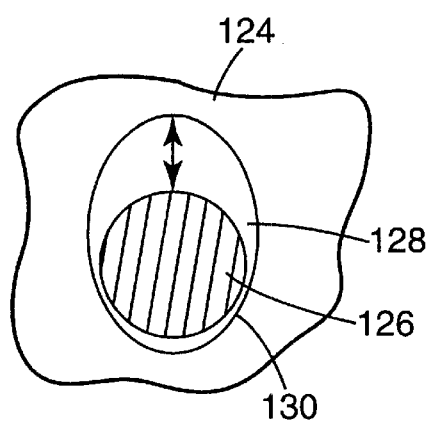
FIG. 1C schematically illustrates a third embodiment of an electromagnetically responsive particle in an assembly substrate.

FIGS. 1A, 1B, and 1C illustrate examples of electromagnetically responsive particles in an assembly substrate. The term "electromagnetically responsive particle" refers to a particle that responds in some manner (e.g., by rotating or otherwise moving) to the application of or change in an electric field, a magnetic field, or both. Included in this definition are electrically responsive particles and magnetically responsive particles which responds to changes in an electric field or a magnetic field, respectively. Reference to the application of or change in an "electromagnetic field" refers to the application of or change in an electric field, a magnetic field, or both. Examples and descriptions are provided herein with reference to the use of electric fields, potentials, etc. to affect electrically responsive particles. It will be understood that similar effects can be obtained using magnetic fields, etc. and magnetically responsive particles.

The electromagnetically responsive particles 106 in FIGS. 1A and 1B are typically electrically or magnetically anisotropic. The electromagnetically responsive particle 126 of FIG. 1C can be isotropic or anisotropic. The application of a sufficiently strong electromagnetic field (e.g., electric field or magnetic field) to a randomly oriented distribution of such particles commonly results in the particles moving, for example, rotating or translating, into a position of lower electric or magnetic potential energy. A change in the applied electromagnetic field can change the state (e.g., orientation or position) of the particle by rotation or translation (e.g., moving from one place to another).

In at least some embodiments, the particles are reflective, typically, diffusely reflective. An optical effect is obtained by modulating the light reflected from the particle as a result of the particle's movement (e.g., rotation or translation) in response to an applied electromagnetic field. Transmissive particles can also be used, although transmissive particles may provide less luminance for equal illumination from a light source and transmissive displays may require additional lenses and/or additional layers for operation.

A variety of different types of particles can be used. For example, suitable types of particles include bichromal particles (e.g., particles with different colored hemispheres), single-colored particles, particles with more than two colors, reflective particles, transparent or translucent particles, particles with a different index of refraction than the assembly substrate, top coat layer, or dielectric fluid around the particles, and particles with transmissive windows. The particles can all have the same color or colors or the particles can be divided into subsets, each subset of particles having different colors and, optionally, different electromagnetic properties. In one embodiment, an assembly includes two subsets of particles where one subset moves in one direction upon application of or change in an electromagnetic field and another subset moves in the opposite direction.

Particles with a variety of shapes can be selected, as desired, based on, for example, the shape of the pockets in the assembly substrate, the particle packing density and distribution, and the application of the assembly. Particles can be spherical, disc-shaped, ellipsoidal, cylindrical, pyramidal, cubic, rectangular, flake-shaped, or have any other regular or irregular shape.

The particles can all have the same size. Alternatively, the particles can be distributed over a range of sizes. The width of the distribution and the range of sizes can be selected as desired for a particular application or product. In some embodiments, particles of two or more different sizes or particles with multi-modal size distributions can be used.

FIGS. 1A and 1B illustrate the use of bichromal particles as an example, however, other types of particles can also be used. Bichromal particles 106 typically have one hemisphere 112 formed with a first color, e.g., black or a dark color, while the other hemisphere 114 is formed with an optically contrasting second color, e.g., white or a light color, as illustrated. A variety of different bichromal particles can be incorporated into the assembly including, for example, particles with red and white, green and white, or blue and white hemispheres (or other combinations using, for example, cyan, magenta, or yellow with white or black). The bichromal particle 106, in the illustrated example, is electrically anisotropic so that one hemisphere is more strongly attracted to, or more strongly repelled by, an electric potential than the other hemisphere.

In one embodiment, the particles 106 are disposed in pockets 110 of an assembly substrate 104, as illustrated in FIG. 1A. The assembly substrate 104 typically includes a base layer and a top coat layer. The remainder of the pocket 110 is filled with a fluid 108 (liquid or gas), typically, a dielectric liquid, that permits movement of the particle 106. The top coat layer is disposed over the pocket 110 to seal the opening through which the particle was deposited in the pocket.

In one embodiment, the liquid is disposed in the pocket before the pocket is sealed. In this embodiment, a non-swellable or slightly swellable polymer is used for the assembly substrate, although other polymers (including swellable polymers) are also acceptable. Suitable non-swellable polymers for the base layer or top coat layer include, for example, polyurethanes, polyesters, polymethyl methacrylates, and polycarbonates.

In another embodiment, the particles are disposed in pockets in the base layer and a top coat layer is then formed over the particles and pockets. The particles 106 are made free to rotate within the assembly substrate 104 by absorbing a liquid into the assembly substrate. The liquid swells the assembly substrate. For example, a liquid agent, such as low viscosity silicone oil, is absorbed into an assembly substrate made of a cured silicone polymer matrix, as discussed in U.S. Pat. No. 4,126,854, incorporated herein by reference. The liquid is absorbed only by the polymer of the assembly substrate 104 and not by the particle 106. Consequently, the swelling of the assembly substrate 104 forms or increases clearance between the pocket 110 and the particle 106.

As an example, the assembly substrate 104 can be formed from a permeable material such as silicone polymer, for example, Dow Corning Sylgard 182 and 184 (Dow Corning Corp., Midland, Mich.). The swelling liquid is typically a dielectric oil. Suitable dielectric oils for use with silicone polymers include, for example, silicone or paraffin oils, such as Dow Corning CS10 and CS20 and Exxon Isopar™ G, K, and L (Exxon Chemical Co., Houston, Tex.).

Another approach, illustrated in FIG. 1B, can be used to dispose the particles 106 within the assembly substrate 104. In this approach, the particles 106 are suspended within a fluid 116 contained within an encapsulating shell 118, as described in, for example, U.S. Pat. No. 5,604,027, incorporated herein by reference. The particles 106 within the shells 118 are then dispersed in pockets of the assembly substrate 104. An advantage of using microencapsulated particles is that the material used for the assembly substrate 104 does not need to be permeable to a liquid, thus enabling a larger selection of materials to be used for the polymer assembly substrate 104.

Yet another approach to forming a particle assembly is illustrated in FIG. 1C. In this approach, a particle 126 is disposed in a pocket 128 in the assembly substrate 124. A dielectric liquid 130 is also disposed in the pocket. The dielectric liquid 130 has one color (e.g., a light color or white) and the particle 126 has a second color (e.g., a dark color or black). The particle 126 is responsive to an applied electromagnetic field so that the particle 126 moves up or down within the pocket 128. If the particle 126 is moved away from the viewing area, then the pocket 128 appears to have the color of the dielectric liquid 130. If the particle 126 is moved toward the viewing area, the pocket 128 appears to have the color of the particle 126. Other embodiments include multiple particles of the same color in a pocket. As an alternative, two different types of particles can be disposed in the pocket, each type having a different color and different (e.g., opposite) response to an applied magnetic or electric field.

Individual Particles in Individual Pockets

Figure 6A:
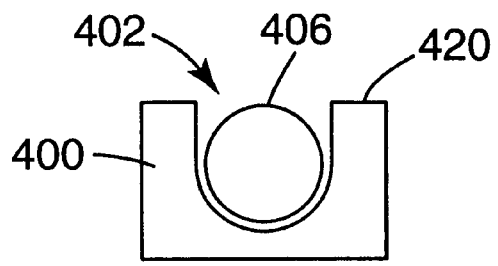
FIG. 6A is a cross-sectional view of one embodiment of a particle disposed in a pocket of a base layer of a particle assembly substrate, according to the invention.
Figure 6B:
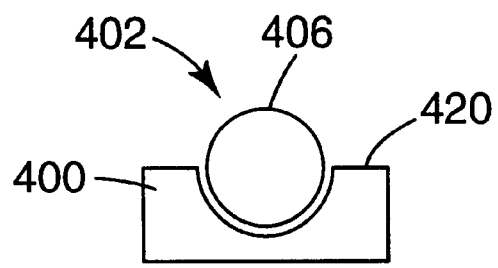
FIG. 6B is a cross-sectional view of a second embodiment of a particle disposed in a pocket of a base layer of a particle assembly substrate, according to the invention.
Figure 6C:
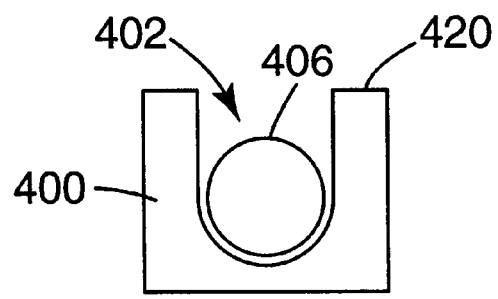
FIG. 6C is a cross-sectional view of a third embodiment of a particle disposed in a pocket of a base layer of a particle assembly substrate, according to the invention.

A variety of assembly/pocket configurations can be selected. One configuration includes placing the particles in individual isolated pockets to form the assembly. FIGS. 6A, 6B, and 6C illustrate pockets sized to contain a single particle. In one embodiment, illustrated in FIG. 6A, the pockets 402 are formed in a base layer 400 to a depth such that the top of an electromagnetically responsive particle 406 disposed in the pocket 402 is proximate to a top surface 420 of the base layer. In another embodiment, illustrated in FIG. 6B, the pocket 402 is shallower so that the particle 406 extends out of the base layer 400. Preferably, the walls of the pockets in the base layer extend beyond the midpoint of a particle disposed in the pocket. In yet another embodiment, illustrated in FIG. 6C, the pocket 402 is deeper so that the particle 406 fits entirely within the pocket and the top surface 420 of the base layer is positioned above the top of the particle.

The configurations illustrated in FIGS. 6A and 6B can result in fewer instances of pockets with multiple particles. The configurations illustrated in FIGS. 6A and 6C can be advantageous because the liquid, within which the particles rotate or translate, can be placed in the pockets prior to forming a top coat layer and, if desired, there is no need to swell the pockets to permit rotation or translation of the particles.

Figure 2:
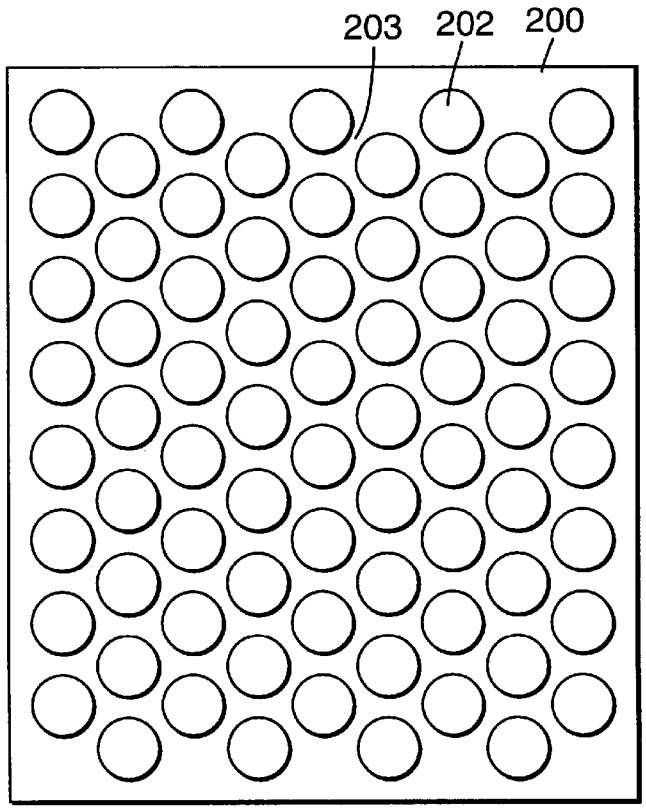
FIG. 2 is a top view of one embodiment of a laser-ablated polymer film with hexagonal close packed pockets, according to the invention.
Figure 3:
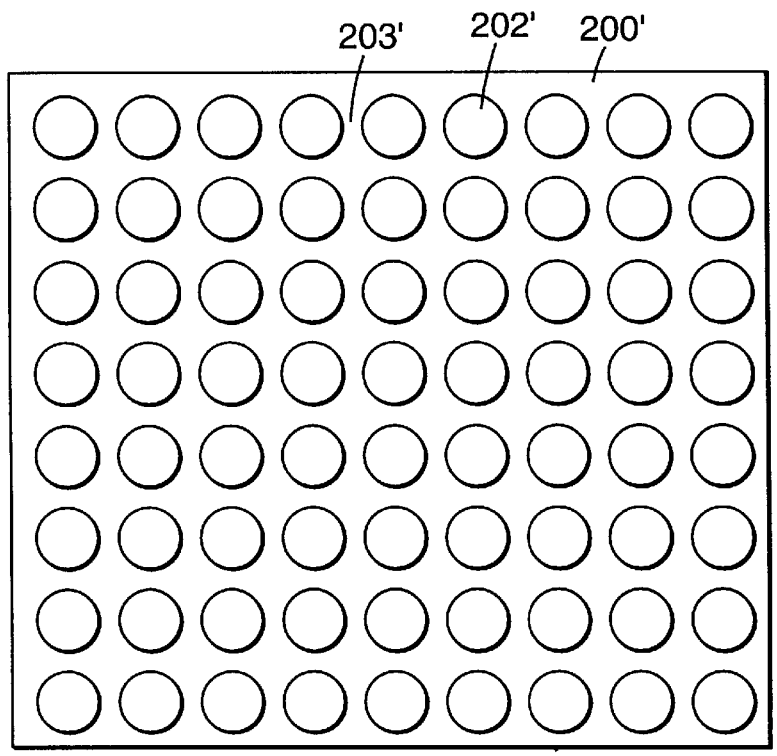
FIG. 3 is a top view of one embodiment of a laser-ablated polymer film with cubic close packed pockets, according to the invention.

The pockets are formed so that a portion of the polymer film is disposed between each of the pockets. In this embodiment, the pockets in the final particle assembly are isolated from each other, as illustrated in FIGS. 2 and 3. In the final particle assembly, fluid from one pocket does not typically flow into another pocket. Each of the pockets 202, 202' is separated from adjacent pockets by walls 203, 203'.

The pockets can be formed using a variety of methods including, for example, laser ablation, photolithography, knurling (see, e.g., U.S. Pat. No. 4,588,258, incorporated herein by reference), diamond turning (see, e.g., McClure, *Laser Focus World*, February 1991, p. 95–105, incorporated herein by reference), casting in mold with curing (see, e.g., U.S. Pat. Nos. 5,183,597 and 5,175,030, incorporated herein by reference), extrusion, stereolithography, etching (e.g., reactive ion etching), and other microreplication techniques. The pockets can be formed with a variety of cross-sectional shapes (viewed from the top of the pocket), including, for example, circular, ellipsoidal, square, rectangular, hexagonal, and triangular cross-sectional shapes, as illustrated, for example, in FIGS. 14A to 14C. The shape of the pocket can be chosen based on the shape and size of the particles, if desired. In some embodiments, the shape of the pocket can change. For example, a pocket can have a hexagonal cross-section near a viewing surface and a circular cross-section at the other end of the pocket.

As one illustrative example, pockets can be formed in a 125 to 250 $\mu$m thick base layer to each hold a single spherical particle having a diameter in the range of 90 to 105 $\mu$m. The depth of the pockets can range from, for example, 50 to 150 $\mu$m.

The pockets in the final assembly have a maximum width that is wider than the diameter (or other relevant length dimension) of the particles to provide clearance for the particles to rotate or translate. However, for pockets that are configured to hold a single particle, the wider the pocket relative to the diameter of the particle, the lower will be the packing density of the particles for a given particle size and minimum wall thickness (typically, with a loss in image saturation). The maximum width of the pockets is typically, for example, at least 2% larger than the average diameter (or other appropriate length dimension) of the particles. In some instances, the maximum width of the pockets is at least 5%, 10%, or 20% larger than the average diameter (or other appropriate length dimension) of the particles. As an example, pockets can be made that give at least 1 to 5 $\mu$m of side clearance for the particle in the pocket. Other factors that can influence pocket size include, for example, the particle size distribution and the type of polymer used (e.g., swellable or non-swellable).

The pockets can be formed in a pattern to obtain a desired density and distribution. FIG. 2 illustrates a base layer 200 with pockets 202 disposed in a hexagonal close packed pattern. A hexagonal close packed pattern is generally recognized as the optimal packing pattern for uniformly sized spherical particles. The density of particles will deviate from the optimal packing based, in part, on the thickness of the walls 203.

For spherical particles (and pockets with circular cross-sections), hexagonal close packing can achieve a packing density of about 91.7%, where the packing density is determined by constructing a horizontal plane through the center of the particles and determining the percentage of the plane that is occupied by the particles. In some embodiments, the packing density of the particles of an assembly is in the range of 85 to 91.7%, accounting for, for example, the thickness of the walls between the pockets.

If desired, other pocket packing configurations can be chosen with lower packing densities. FIG. 3 illustrates a base layer 200' with pockets 202' in a cubic close packed pattern. Other regular or irregular patterns can be used, although close packed patterns, particularly, the hexagonal close packed pattern, can provide higher particle density, better display resolution, contrast, or color saturation, or higher reflectance or optical brightness. The particular pattern of pockets can be chosen based on factors, such as, for example, the application of the particle assembly, particle size and shape, the desired particle density, pocket size and shape, and the objects to be displayed.

Figure 14A:
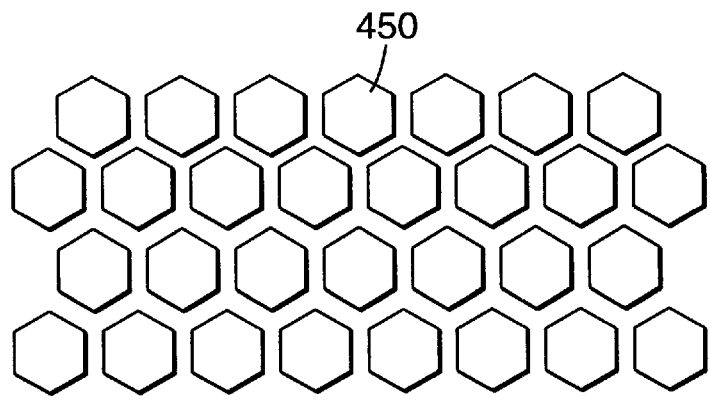
FIGS. 14A to 14C are schematic top views of particle assembly configurations, according to the invention.
Figure 14B:
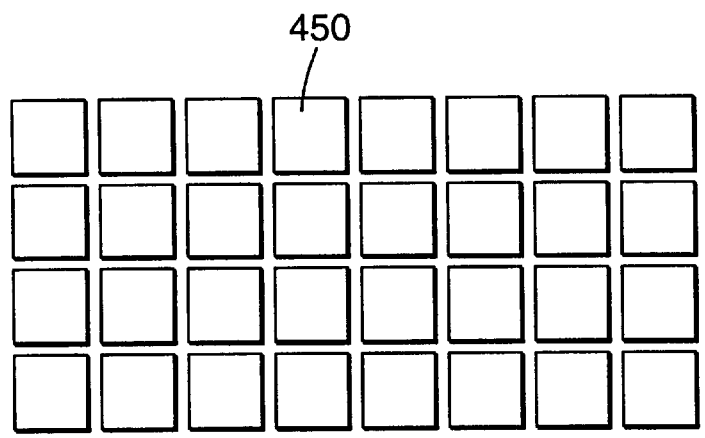
Figure 14C:
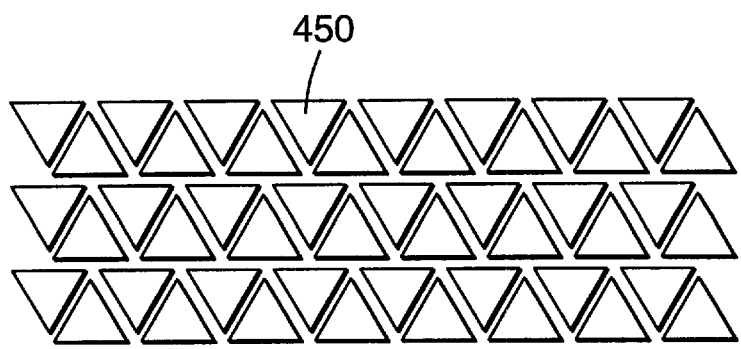

In FIGS. 2 and 3, the pockets are illustrated as having a circular cross-section when viewed from the top. Pockets with other cross-sections can be used and the patterns in which those pockets are formed in the assembly substrate can be appropriately modified. Pockets with non-circular cross-sections can be used if, for example, the particles are non-spherical, the particles are sufficiently small to fit in the pockets, or the pockets are sized to contain multiple particles. FIGS. 14A to 14C illustrate close packed patterns for pockets 450 with hexagonal, square, and triangular cross-sections, respectively, when viewed from the top. Other pocket cross-sections and packing patterns can be used, if desired, including non-close-packed and irregular packing patterns. For example, cylindrical particles can be placed in pockets having a half-cylinder shape.

Multiple Particles in Individual Pockets

Figure 12:
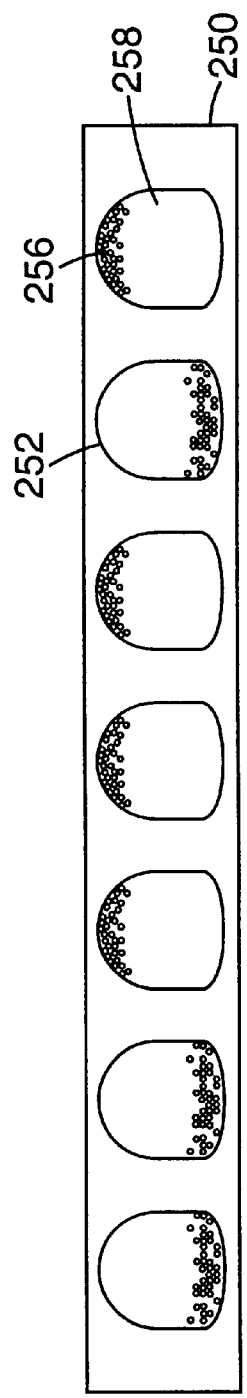
FIG. 12 is a cross-sectional view illustrating another embodiment of a particle assembly, according to the invention.

FIG. 12 illustrates an embodiment of an assembly substrate 250 with pockets 252 that contain multiple particles 256 in a dielectric fluid 258. The pockets can be selected to each contain at least two particles and, typically, for example, 25 to several thousand particles. The number of particles disposed in a single pocket can depend on a variety of factors including, for example, the size of the particles, the size and shape of the pockets, and the desired distribution of particles in the pocket (e.g., monolayer or multiple layers of particles in the pocket).

The particles are typically smaller than those used in the single particle/single pocket embodiments described above. For example, the particles can have a diameter of 0.1 to 5 $\mu$m and the pockets can have a diameter of 30 to 250 $\mu$m. One embodiment includes 0.3 to 0.4 $\mu$m diameter particles in 50 to 60 $\mu$m diameter pockets.

Preferably, the material of the particles and the dielectric fluid disposed in the pockets have substantially the same density for ease of movement of the particles within the dielectric fluid. More preferably, the densities of the dielectric fluid and the material of the particles are sufficiently close so that the particles are not noticeably affected by gravity or other forces (e.g., centrifugal forces). Preferably, the particles do not migrate during a desired period of operation, for example, the period during which information is displayed without change to or reassertion of the electromagnetic field.

Typically, either the dielectric fluid is a different color than the particles or particles with different colors are used. The particles are moved through the dielectric fluid using an electromagnetic field so that the particles are moved toward or away from the viewing surface of the assembly substrate. The particular color that is displayed can depend on a variety of factors including, for example, the color and reflectance of the particles, the color and reflectance of the dielectric fluid, the color and reflectance of the assembly substrate and top coat, the position of the particles within the pocket, the number of particles in the pocket, the size and shape of the particles, the size and shape of the pocket, and the strength and duration of the electromagnetic field. In some instances, an electromagnetic field is applied or changed to move only a portion of the particles or to move the particles to a position intermediate between the top and bottom of the pocket. This can be used to control color saturation (e.g., to provide a gray scale or the like for other colors).

FIGS. 13A to 13L illustrate different pocket and particle configurations that can be used, for example, to tailor display contrast characteristics. The following observations can be extended to other pocket geometries and other numbers of particles per pocket.

Figure 13A:
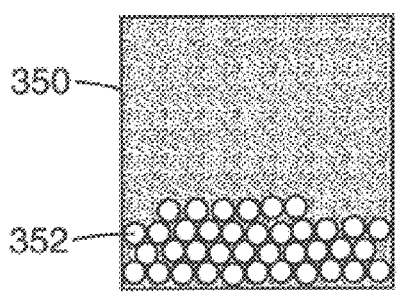
FIGS. 13A to 13L are cross-sectional and top views of various pocket cross-sectional configurations and particle positions for a pocket of the particle assembly of FIG. 12.
Figure 13B:
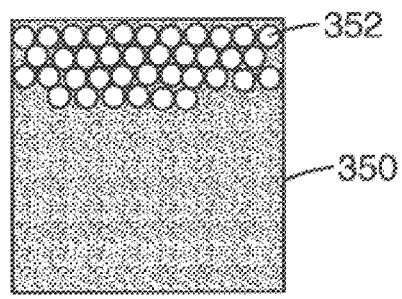
Figure 13C:
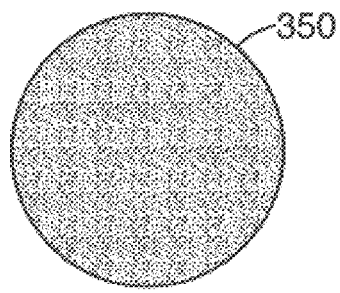
Figure 13D:
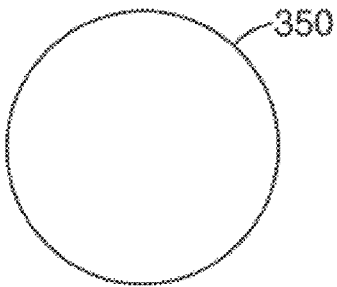

FIGS. 13A and 13B illustrate cross-sections of a pocket 350 having a cylindrical shape. FIGS. 13C and 13D illustrate top views of the pocket 350 when the particles 352 are at the bottom of the pocket (FIG. 13C) and when the particles are at the top of the pocket (FIG. 13D). Typically, in this embodiment, only the top surface of the pocket is viewable. Therefore, if sufficient particles are in the pocket to provide at least a few layers when packed at the top or bottom of the pocket, the pocket presents relatively uniform color in both of the states illustrated in FIGS. 13C and 13D.

Figure 13E:
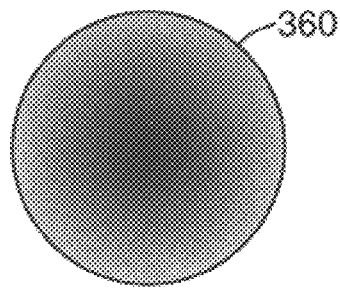
Figure 13F:
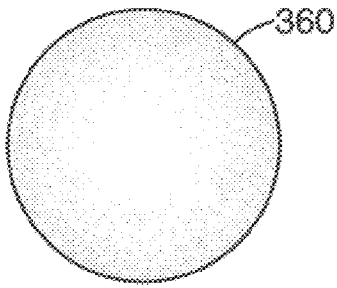
Figure 13G:
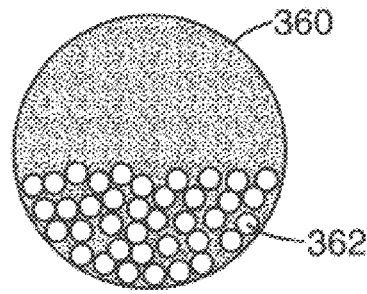
Figure 13H:
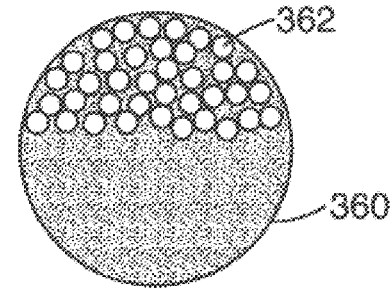

FIGS. 13E and 13F illustrate cross-sections of a spherically shaped pocket 360 packed with particles 362. FIGS. 13G and 13H illustrate top views of the pocket 360 when the particles are at the bottom of the pocket (FIG. 13G) and when the particles are at the top of the pocket (FIG. 13H). For spherical pockets, the entire surface of the upper hemisphere of the pocket is viewable (assuming that the surrounding substrate material is substantially transparent). When the particles are at the bottom of the spherical pocket, the center of the pocket, when viewed from above the top surface, typically corresponds to the color of the dielectric fluid. However, the color becomes increasingly blended with the color of the particles further away from the center. This is a result of having less dielectric fluid between the viewer and the particles with increasing distance from the center of the pocket. Conversely, when the particles are at the top of the spherical pocket, the center of the pocket, when viewed from above the top surface, typically corresponds to the color of the particles, but that color becomes increasingly blended with the color of the dielectric fluid further away from the center.

Figure 13I:
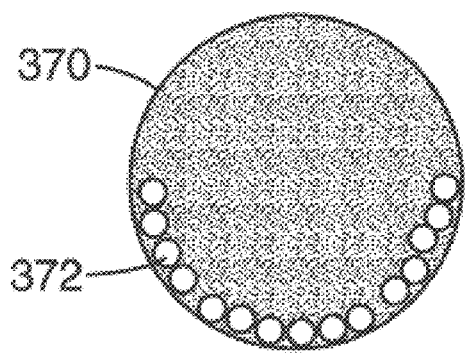
Figure 13J:
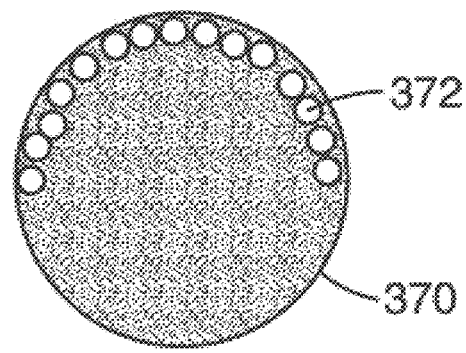
Figure 13K:
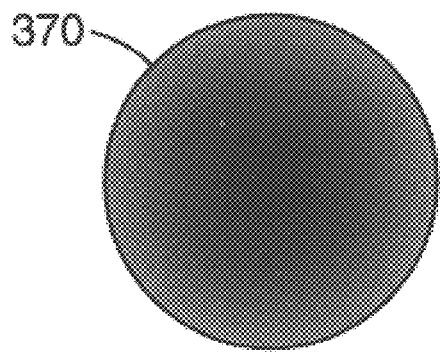
Figure 13L:
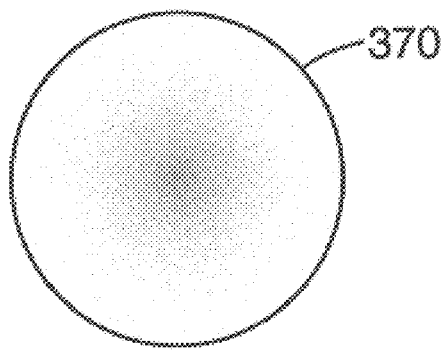

FIGS. 13I and 13J illustrate cross-sections of a spherically shaped pocket 370 having a monolayer of particles 372 that cover, for example, half of the sphere. FIGS. 13K and 13L illustrate top views of the pocket 370 when the particles are at the bottom of the pocket (FIG. 13K) and when the particles are at the top of the pocket (FIG. 13L). When the particles are at the bottom of the spherical pocket, the center of the pocket, when viewed from above the top surface, typically corresponds to the color of the dielectric fluid, but that color becomes increasingly blended with the color of the particles further away from the center. When the particles are at the top of the spherical pocket, the edges of the pocket, when viewed from above the top surface, typically corresponds to the color of the particles, but that color becomes increasingly blended with the color of the dielectric fluid closer to the center. Because the particles form only a monolayer, the appearance of the dielectric fluid color will typically be more pronounced than for the pocket illustrated in FIGS. 13G and 13H.

Particles in Connected Pocket Structures

In other embodiments, the pockets can be formed in one or more cells within the assembly substrate so that each pocket is in fluid communication with at least one additional pocket, as illustrated in FIGS. 4A, 4B, 4C, and 5. Typically, a cell is defined as the group of pockets that are in fluid communication with each other (e.g., where crossflow of fluid between pockets is possible). Each cell forms a substantially enclosed environment. These embodiments of the particle assembly include one or more cells.

Figure 4A:
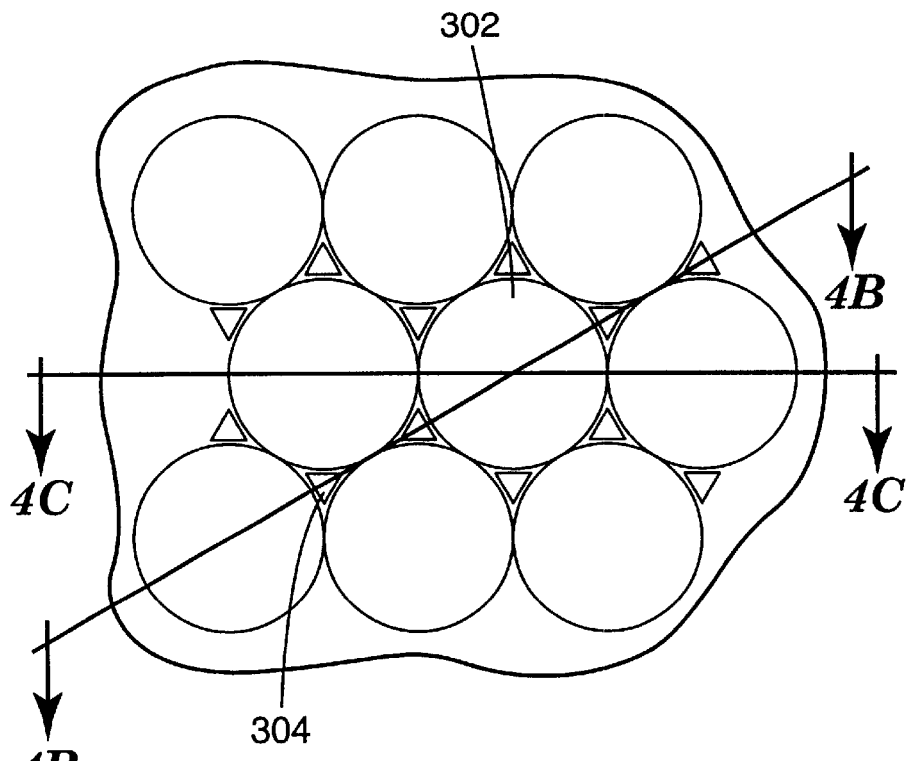
FIG. 4A is a top view of another embodiment of hexagonal close packed pockets with interstitial posts, according to the invention.
Figure 4B:
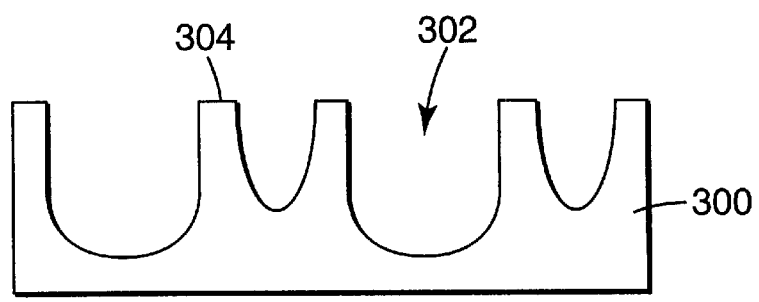
FIG. 4B is a cross-sectional view of the polymer film of FIG. 4A along line 4B—4B.
Figure 4C:
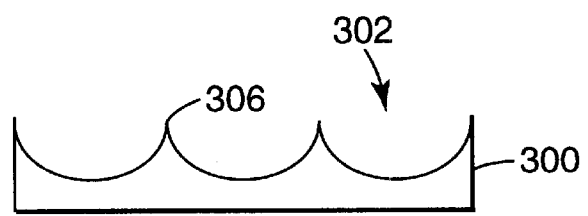
FIG. 4C is a cross-sectional view of the polymer film of FIG. 4A along line 4C—4C.

FIGS. 4A, 4B, and 4C illustrate one example of this embodiment in a hexagonal close packed arrangement. Other packing arrangements, such as cubic close packed or other non-close packed arrangements, can also be selected, if desired. In the example illustrated in FIG. 4A, each of the pockets 302 in the base layer 300 of the assembly substrate is in fluid communication, in the final assembly, with at least six adjacent pockets. FIG. 4C illustrates a cross-sectional view of the base layer 300 along a line in that does not pass through interstitial points between the pockets. The low walls 306 permits fluid communication between adjacent pockets 302 of the particle assembly.

FIG. 4B illustrates a cross-sectional view of the base layer 300 along a line that includes the interstitial points of the hexagonal close packed arrangement. At each of the interstitial points is a post 304 constructed from the base layer 300. The posts 304 serve to define the pockets 302. In some embodiments, the posts extend beyond the top of the particles. When a top coat is formed over the base layer and pockets, the top coat will typically contact the posts.

In other embodiments, a shorter post can be used so that the post extends only to, for example, the midpoint or two-thirds the height of the particle. This post is typically not in contact with the top coat layer. Optionally, additional particles can be seated on the posts. Typically, these particles are substantially smaller than the particles in the pockets, as the particles seated on the posts fit in the interstitial spaces between the particles in the pockets and above the posts. This can increase the packing density of particles in the assembly.

Typically, the edges of the resulting single-cell particle assembly are sealed by, for example, heat, ultrasonic, or mechanical sealing or by forming walls around the periphery of the base layer. The sealing prevents leakage of the fluid from the particle assembly. Cutting a particle assembly with a single cell can result in leakage of fluid from the entire particle assembly due to the low walls between adjacent pockets.

Figure 5:
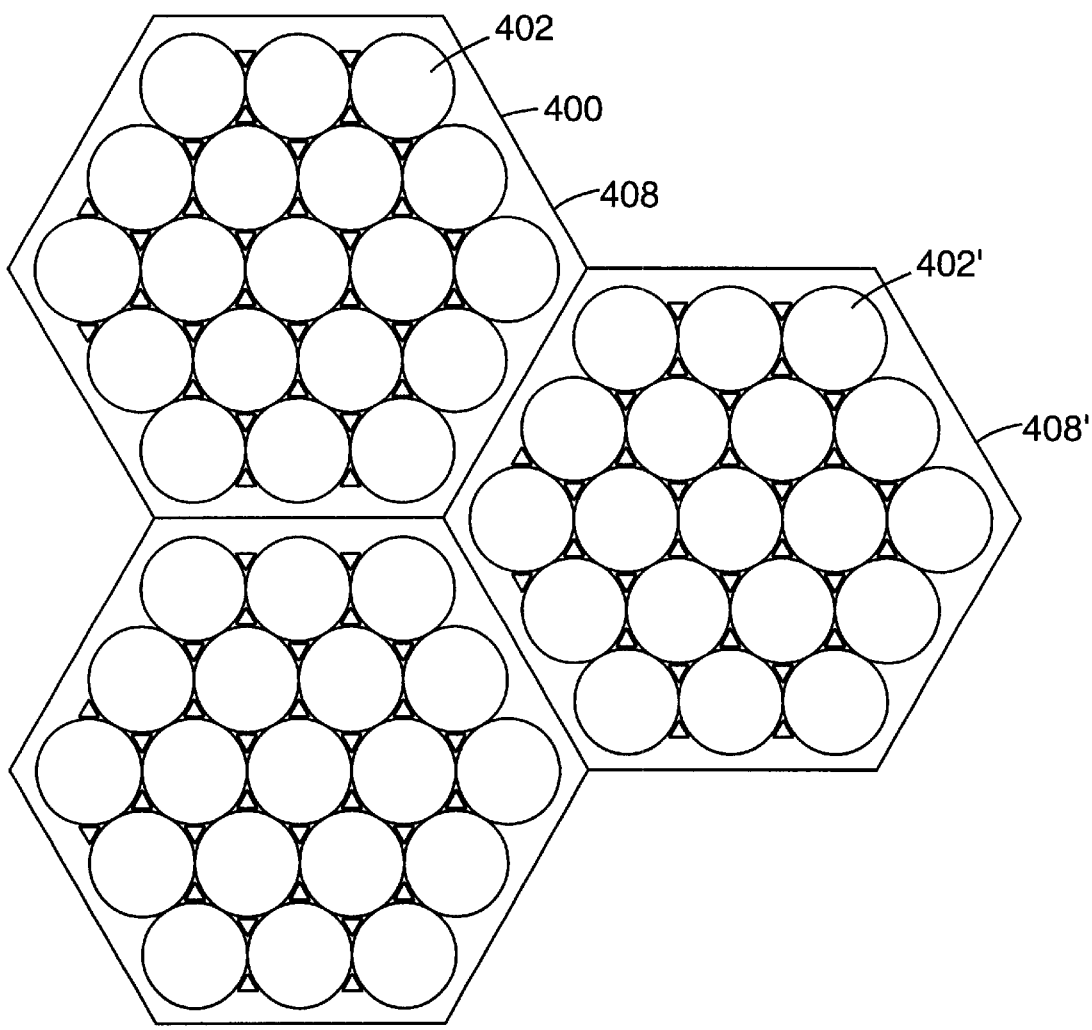
FIG. 5 is a top view of a polymer film comprising cells of adjacently disposed pockets, according to the invention.

FIG. 5 illustrates yet another embodiment of a base layer 400 having two or more cells 408 of pockets 402. There is fluid communication between pockets in a given cell, but the cells are separated by walls to substantially prevent fluid communication with pockets 402' in other cells 408', although it will be recognized that imperfections in the walls between the cells can permit some fluid to flow between the pockets 402, 402' of different cells 408, 408'. In the illustrated embodiment, the cells are hexagonal and disposed in a hexagonal arrangement. Other cell shapes (e.g., square, circular, rectangular, ellipsoid, triangular, herringbone, and other regular or irregular shapes), as well as other cell arrangements can be used. In this embodiment, if the particle assembly is cut, there will be leakage from only those cells traversed by the cut. This particular configuration can result in a higher density of particles than could be obtained with each of the pockets separated from the other pockets by walls, and yet still maintain protection against loss of fluid from undamaged cells.

In any of these configurations, swellable or non-swellable polymers or other materials can be used as the base layer and top coat layer. In some instances, it may be preferable to use a non-swellable material because swelling will typically result in lower particle density.

Previously Used Particle Media

Figure 10:
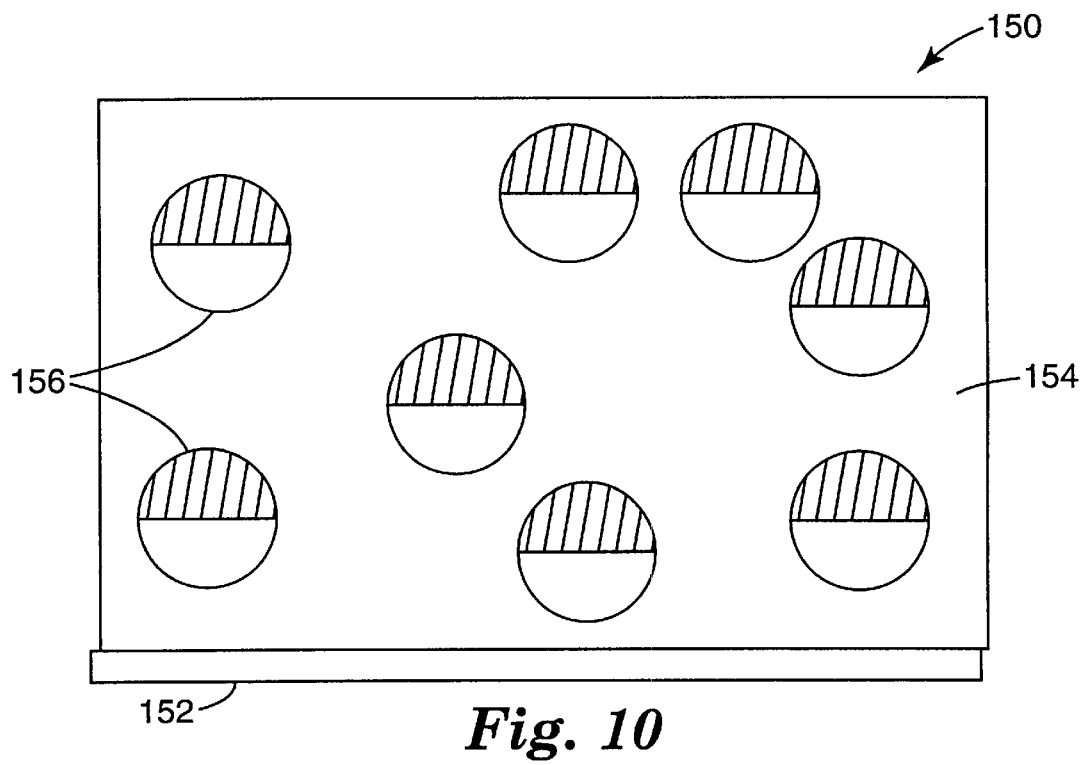
FIG. 10 illustrates a particle assembly using random placement of electromagnetically responsive particles.

One previous approach to forming a reflective particle assembly included mixing electromagnetically responsive particles in a polymer matrix; forming a layer of the polymer matrix; and then curing or setting the layer. This led to a random distribution of the electromagnetically responsive particles within the polymer matrix, as illustrated in FIG. 10. The film 150 included a substrate layer 152 on top of which was positioned a polymer assembly substrate 154. Bichromal electromagnetically responsive particles 156 were disposed randomly throughout the assembly substrate 154.

Typically, there are problems associated with the structure illustrated in FIG. 10. Since there is a large separation between particles 156 within the assembly substrate 154, the resolution and contrast of the film are well below optimum. Additionally, the film is required to be relatively thick in order for the particles to cover a high percentage of the viewing surface and, consequently, the operating voltage is high.

Another particle assembly, described in U.S. Pat. No. 5,604,027, incorporated herein by reference, has been formed by coating a substrate with a photoresist and then patterning the photoresist using photolithographic methods. The photoresist is etched to form cavities into which rotatable particles, each having a transmissive window, are disposed. One disadvantage of this photolithographic method is that it may be difficult to pattern large substrates (e.g., substrates the size of a display screen or paper page). Although a large substrate might be patterned by successively patterning individual portions of the substrate, this requires maintaining registration for each successive patterning step. The method also requires several steps involving the deposition and removal of chemicals, which may be incompatible with particular substrates. Moreover, photolithography typically results in the formation of cylindrical cavities with flat bottoms. These cavities may not be optimal for use with spherical particles.

Formation of Pocketed Assembly Substrates

The photolithography method described above, as well as microreplication, knurling, diamond turning, casting, extrusion, stereolithography, etching, and other techniques can be used to form the pockets in the base layer of the assembly substrate. A new useful method for the formation of a particle assembly includes the irradiation of a polymer film to remove portions of the polymer film by ablation and form pockets that can be used in making a particle assembly for holding electromagnetically responsive particles. The polymer film with the pockets can be used as a base layer for a particle assembly or the film can be used as a mold from which suitable base layers for the particle assembly can be formed. Suitable polymer films for forming ablated products include, for example, polyimides (such as Kapton™ from E.I. DuPont de Nemours & Co., Inc., Wilmington, Del.), polyesters and other films that absorb the laser light without charring.

Suitable methods for ablating the polymer film include removing portions of the film using light or particle beams including, for example, lasers, electron beams, and ion beams. Suitable lasers include, for example, excimer lasers, such as KrF, $F_2$, ArF, KrCl, and XeCl lasers, although other lasers can be used. The ablation (i.e., removal of portions of the film) can be achieved by a variety of mechanisms including, for example, sublimation, vaporization, decomposition, or ejection of portions of the film. Examples of suitable methods of laser ablation of polymer films are found in U.S. patent application Ser. No. 08/429,302, incorporated herein by reference.

As an example, a laser can be directed at the polymer film to remove portions of the polymer film and form one or more individual pockets. Multiple pockets can be simultaneously formed using a mask and, optionally, an imaging lens disposed between the laser source and the polymer film The laser or film can then be moved to form the next pocket(s). Optionally, a bank of lasers can be used.

The shape of the pocket can be controlled using the beam, if desired. The cross-section of the beam can influence the contours of the bottom of the pocket. This can result in the formation of a pocket with a contoured bottom that more closely approximates the shape (e.g., spherical or cylindrical) of the particle to be used in the particle assembly.

Figure 11A:
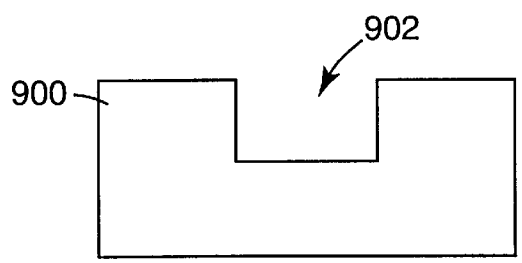
FIGS. 11A to 11C are cross-sectional views illustrating steps in forming a pocket having a contoured bottom region.
Figure 11B:
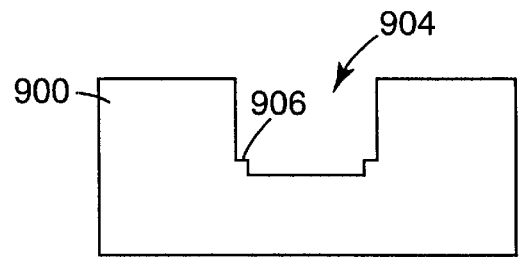
Figure 11C:
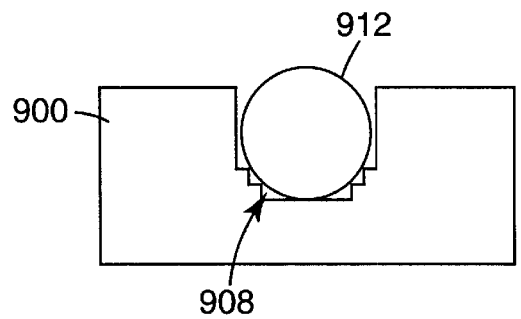

Another method of contouring the bottom of the pocket is illustrated in FIGS. 11A to 11C. The polymer film 900 is ablated using a beam to form a first cavity 902, as illustrated in FIG. 11A. A second cavity 904 is then formed using a narrower beam, as illustrated in FIG. 11B. This second cavity 904 is, however, deeper than the first cavity 902, thereby generating a step 906. The depth of the cavities can be controlled by modifying parameters of the beam such as, for example, the beam intensity and the duration of exposure of the polymer film 900 to the beam. This can be repeated with increasingly narrow beams as desired. FIG. 11C illustrates a pocket 908 formed using three beams.

As illustrated in FIG. 11C, a particle 912 fits more closely within this contoured pocket than if the pocket were a cylinder. This can be advantageous because the closer the fit, the easier it is to maintain a particular state of the particle (particularly, a bichromal particle) in the pocket because of the larger surface area of contact between the particle and the pocket. When the particle is more securely held within the pocket, there will be less tendency for the particle to wobble. This can reduce the loss of image quality over the time. Another advantage is that less fluid is needed to fill the pocket.

The Polymer Film as a Mold for the Particle Assembly Substrate

The polymer film with pockets, whether formed by ablation, photolithography, microreplication, knurling, diamond turning, casting, extrusion, stereolithography, etching, or any other technique, can be used as a base layer of a particle assembly substrate with the particles being disposed in the pockets of the particle assembly. Alternatively, the polymer film can be used as a mold to form the base layer of the particle assembly substrate. This can be particularly useful if the polymer film is made of a material that is not suitable for the particle assembly substrate or the polymer film includes regions that are discolored or decomposed due to ablation or other pocket-forming processes.

Figure 7A:
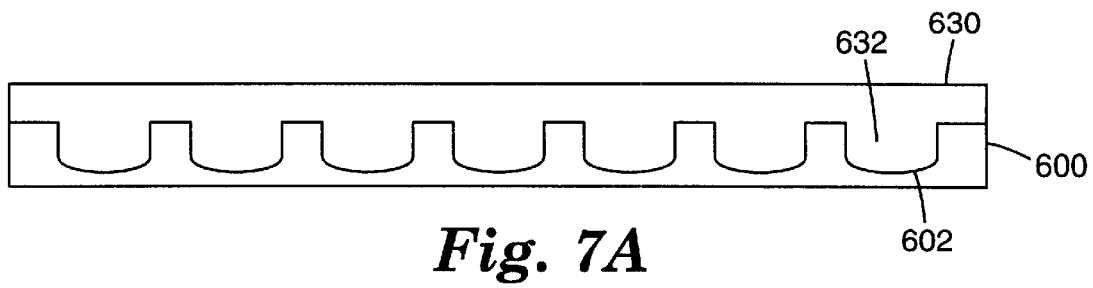
FIGS. 7A to 7B are cross-sectional views illustrating one embodiment of forming an assembly substrate from a polymer film having pockets, according to the invention.
Figure 7B:
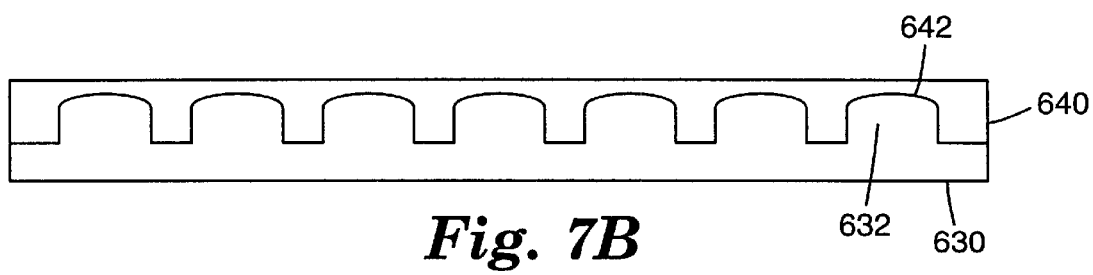

FIGS. 7A and 7B illustrate one process for forming the base layer 640 of a particle assembly substrate using a polymer film 600. In this process, the polymer film 600 with pockets 602 is a first mold. A second mold 630 with projections 632 corresponding to the pockets 602 is formed by depositing a molding material over the polymer film 600 to fill the pockets 602, as illustrated in FIG. 7A. The molding material is hardened, if necessary, to form the second mold 630. Typically, this molding material can include a silicone, polymeric, or rubber molding compound, such as, for example, hot melt adhesives, one or two part sealants, butyl rubbers, polyurethanes, or a metal film (formed by, for example, chemical or physical vapor deposition, electroplating, or electroless plating of a metal such as nickel, silver, gold, chrome, and copper). If necessary (particularly for polymeric or rubber molding compounds), the molding material can harden over time or hardening can be caused or accelerated by curing using, for example, heat, light (e.g., ultraviolet light), actinic radiation, an electron beam, or the like.

The second mold 630 is removed from the polymer film 600 and the base layer 640 with pockets 642 is formed by depositing a substrate material over the second mold 630. This substrate material is hardened, if necessary, to form the base layer 640 of the particle assembly substrate. The substrate material is typically a polymer, such as, for example, a thermoplastic or a thermoset polymer (e.g., light or heat curable acrylate polymers, polyurethanes, or epoxy resins). The base layer 640 is removed from the second mold 630 and can be filled with the particles. A release agent can be coated on the polymer film 600 or second mold 630 to facilitate release of the second mold 630 and base layer 640, respectively.

Figure 8:
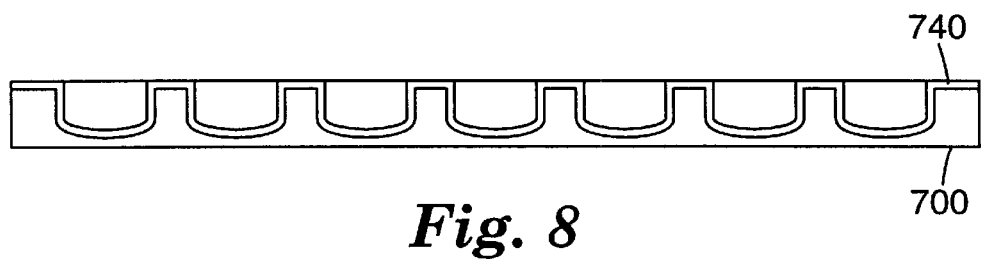
FIG. 8 is a cross-sectional view illustrating another embodiment of forming an assembly substrate from a polymer film having pockets, according to the invention.

FIG. 8 illustrates an alternative method for using the polymer film 700 as a mold. In this method, a substrate material (e.g., a thermoplastic or thermoset polymer) is conformally deposited over the surface of the polymer film 700 to form the base layer 740. The base layer 740 is then removed from the polymer film 700 and filled with particles. The substrate material can be hardened, if necessary. Again, a release agent can be coated onto the polymer film 700 to facilitate removal of the base layer 740.

The Formation of the Particle Assembly

Figure 9A:
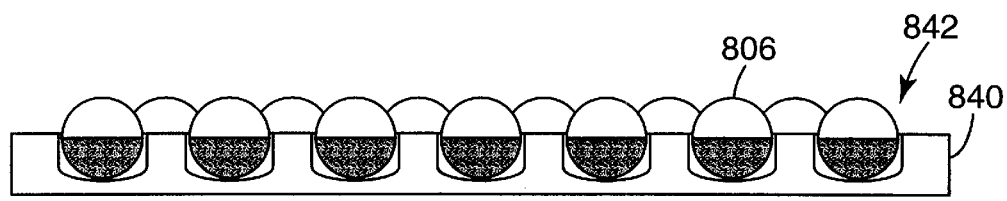
FIGS. 9A to 9C are cross-sectional views illustrating one embodiment of forming a particle assembly according to the invention.
Figure 9B:
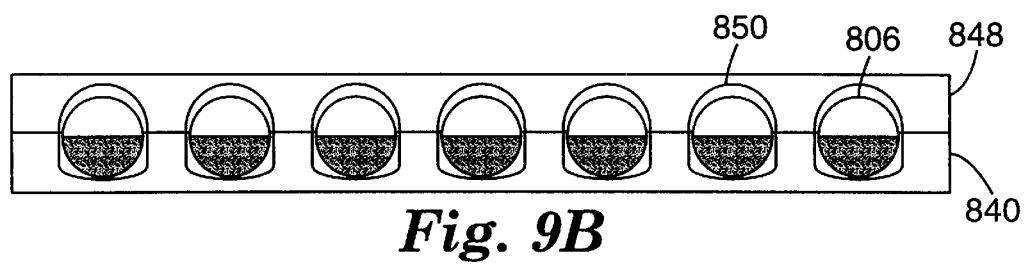
Figure 9C:
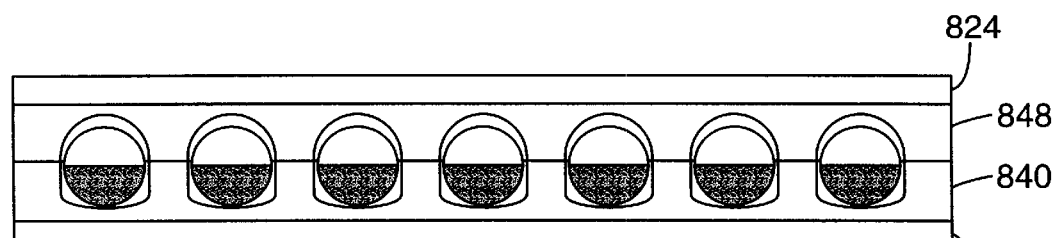

As illustrated in FIGS. 9A to 9C, a particle assembly 840 can be formed from a polymer film containing pockets (generated by ablation or other methods) or using the polymer film as a mold to produce an assembly substrate with pockets. Electromagnetically responsive particles 806 are deposited in the pockets 842, as illustrated in FIG. 9A.

Typically, at least 95% of the pockets contain at least one particle or the desired number of particles (for configurations with multiple particles in each pocket). Preferably, at least 99% of the pockets contain at least one particle or the desired number of particles (for configurations with multiple particles in each pocket). The particles can be brushed, swept, wiped, dropped, shaken, or otherwise placed into the pockets. One example of a method for filling the pockets includes dispensing particles onto the base layer of the assembly substrate. The substrate is then advanced past a rotating device with brushes that extend toward the substrate. This device rotates so that the brushes move in the opposite direction of the advancement of the substrate. The brushes sweep particles into unfilled pockets and remove particles from areas between the pockets. The excess particles are typically pushed back onto the unswept portion of the substrate, pushed off the sides of the substrate, or picked up by the brushes. Optional suction devices can be positioned to remove excess particles picked up by the brushes.

The length and stiffness of the brushes, as well as the diameter of the brush whiskers, can be selected depending on the size and type of the particles. Longer brushes are typically useful with smaller particles (if the position of the device relative to the substrate is not adjustable) and stiffer brushes are typically useful with heavier particles.

Another method of depositing particles in the pockets includes providing an electromagnetic field that attracts the particles into the pockets. Because the particles are electrically responsive, they will be attracted by the appropriate selection of the electromagnetic field. This techniques can be used in conjunction with other methods including the brushing technique described above. The application of the electromagnetic field can occur, for example, after the particles have been dispensed onto the substrate and prior to or during the brushing of the particles into the pockets.

After depositing the particles 806 in the pockets 842, a top coat layer 848 is typically formed over the particles, as illustrated in FIG. 9B. This top coat layer 848 is typically a liquid polymer material that can be dried or crosslinked to form a solid layer. The top coat layer 848 can be formed from a material permeable to a liquid that swells the base and top coat layers, if desired.

Figure 15:
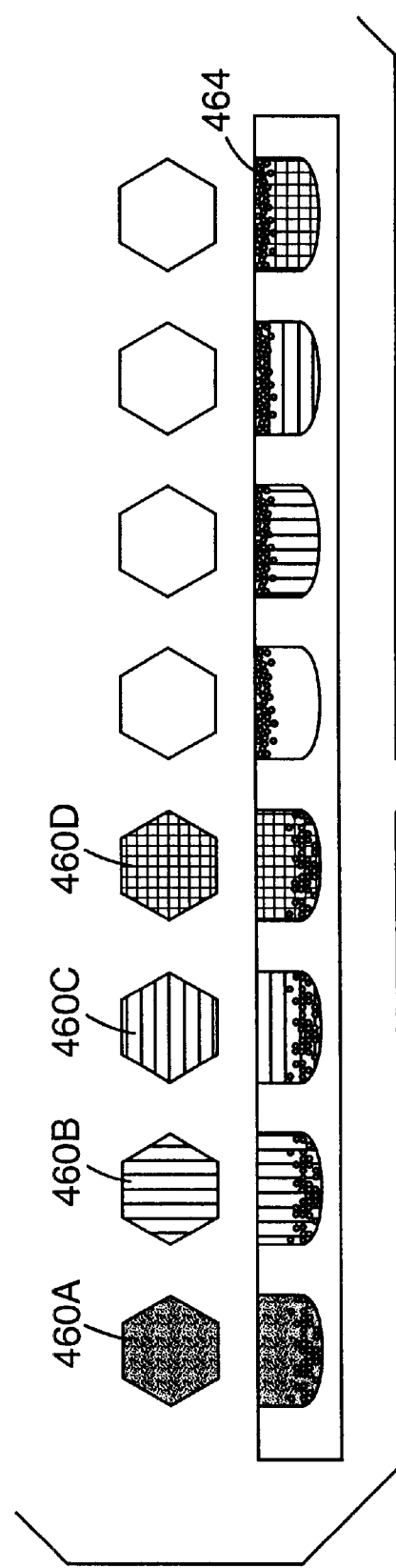
FIG. 15 is a cross-sectional view and top view of a color particle assembly, according to the invention.

Alternatively, if the pocket 842 is large enough to hold the entire particle 806, a fluid (e.g., a dielectric liquid) can be added prior to forming the top coat layer 848. The liquid can be added by a variety of techniques including, for example, curtain or flood coating, spraying, and printing. In some embodiments, particularly some of the embodiments having pockets with multiple particles, liquids having different colors can be individually added to different subsets of the pockets, typically in a non-random pattern, by a technique such as, for example, ink jet or other methods of printing. For example, as illustrated in FIG. 15, four differently colored liquids 460A, 460B, 460C, 460D (e.g., black, magenta, cyan, and yellow or white, red, blue, and green) can be added to individual subsets of pockets in a pattern that could be used to form a full color display. Horizontal, vertical, or diagonal rows of pockets could be filled with the same color liquid. The particles 464 in this embodiment could be, for example, white or light colored. The particles could be used to selectively hide the color of the dielectric fluid, as desired.

As an alternative, the particles can be colored and the liquid can be white or light colored. A full color display can be formed using four subsets of particles with different colors (e.g., black, magenta, cyan, and yellow or white, red, blue, and green). The appropriate colored particles can be deposited in the subsets of pockets. As yet another alternative, particles of different colors and different electromagnetic properties can be deposited in the pockets. For example, one subset of particles with a color such as red and a second subset with white particles can be deposited in the pockets that are designated to provide red color. The red and white particles can have opposite electromagnetic. response so that as one subset of particles is attracted to the top of the pocket, the other subset is attracted to the bottom of the pocket. This configuration can be repeated for other pockets using appropriately colored particles (for example, blue, green, yellow, cyan, magenta, or black). The fluid in the pockets can be colored, clear, or translucent.

Returning to FIG. 9B, the top coat layer 848 can be formed of a material that is clear, transparent, or colored. The top coat layer 848 can also be formed of a material that is semi-opaque, if the particles are positioned sufficiently close to the viewing surface as to be viewable through the top coat layer. Where the liquid is added prior to the top coat layer or the particles are microencapsulated, the top coat layer 848 can be formed from a nonpermeable polymer material including, but not limited to, polystyrene, polyurethane, polypropylene, acrylic, and epoxy polymeric materials. In this embodiment, there is no need to swell the assembly substrate.

Upper and lower electrodes 824, 826 are typically positioned on or near opposing surfaces of the base layer 840 and top coat layer 848, as illustrated in FIG. 9C. In some embodiments, at least one of the upper and lower electrodes is spaced apart from the base layer 840 and top coat layer 848 and, in other embodiments, the upper and lower electrodes are positioned on the surfaces of the base layer 840 and top coat layer 848. An electromagnetic field applied across the electrodes moves (e.g., rotates or translates) the particles 806 in alignment according to the applied field.

Typically, the upper electrode 824 over the top coat layer 848 is made using a transparent conductor, such as a thin film of a metal (such as, for example, aluminum, nickel, chromium, gold, copper, platinum, or tin) or a conductive compound (such as, for example, indium tin oxide, vanadium oxide, doped tin oxide, polythiophene, polyaniline, and other conductive polymers). The lower electrode 826 can be formed using the same or another conductive material and can be transparent or opaque. In an alternative embodiment, the base layer of the particle assembly substrate can be formed using a conductive polymer. This base layer can then act as the lower electrode, so that no additional electrode layer is needed.

The upper electrode or lower electrode or both can be formed so that each of the pockets or groups of pockets are individually or collectively addressable. For example, the pockets can be addressed in an X-Y format or any other known addressing configuration. In one example, the lower electrode is a single electrode covering substantially the entire portion of the substrate containing particles and the upper electrode includes multiple electrode members that allow individual addressing of single pockets or a group of adjacent pockets. The opposite configuration with a single upper electrode and a lower electrode with multiple electrode members can also be used. By individual activation of the electrode members, information (e.g., alphanumeric characters, symbols, or other graphics) can be displayed or a desired pattern may be formed using the electromagnetically responsive particle assembly.

Contrast in a display application using the particles assemblies can depend on a variety of factors including, for example, the color and reflectance of the particles, the color of the assembly substrate, the color of a dielectric fluid in the pocket, the packing density of the particles, the packing density of the pockets, the thickness of the walls between the pockets, the arrangement of the pockets, and the number of particles affected by a change in the voltage of a single electrode. In some displays and other applications, the particle assembly is configured to achieve a contrast of at least 5:1. In some embodiments, the contrast can be 10:1 or better. Contrast can be measured using a spectrometer or similar light reflection measuring instrument. Contrast is, typically, the relative difference in reflected luminescence or brightness between light and dark areas of the particle assembly.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. An assembly comprising:
   an assembly substrate defining a plurality of substantially enclosed, fluid-containing cells, each cell having a regular shape and comprising a plurality of pockets in fluid communication with each other, each pocket being defined by the assembly substrate to hold at least one electromagnetically responsive particle within the pocket; and
   a plurality of electromagnetically responsive particles disposed in the at least one cell and held within the pockets.

2. The assembly of claim 1, wherein the assembly forms a display medium in which the particles are configured and arranged to move in response to an applied electromagnetic field to provide selective reflection of light illuminating the assembly.

3. The assembly of claim 1, wherein each pocket of the assembly substrate is sized to contain a single particle.

4. An assembly comprising:
   an assembly substrate defining at least one substantially enclosed, fluid-containing cell, each cell comprising a plurality of pockets in fluid communication with each other, each pocket being defined by the assembly substrate to hold at least one electromagnetically responsive particle within the pocket and each pocket of the assembly substrate is sized to contain a single particle with 1 to 5 μm of side clearance; and
   a plurality of electromagnetically responsive particles disposed in the at least one cell and held within the pockets.

5. The assembly of claim 1, wherein the plurality of pockets of the at least one cell are disposed in a hexagonal close-packed pattern.

6. The assembly of claim 1, wherein the at least one cell has a hexagonal cross-section.

7. The assembly of claim 1, wherein the assembly comprises a plurality of cells which are disposed in a hexagonal close-packed pattern.

8. The assembly of claim 1, wherein the particles comprise bichromal particles.

9. The assembly of claim 1, wherein at least 99% of the pockets of the assembly substrate contain at least one particle.

10. The assembly of claim 1, wherein the assembly substrate defines a plurality of posts for each cell, the posts separating adjacent pockets.

11. The assembly of claim 10, wherein the posts are disposed in interstitial positions between adjacent pockets.

12. The assembly of claim 10, further comprising interstitial particles disposed over the posts.

13. An assembly comprising:
   an assembly substrate defining a plurality of pockets, each pocket of the assembly substrate corresponding to a pocket formed by ablation of a polymer film;
   particles disposed in the pockets of the substrate, wherein each of the particles is responsive to an applied electromagnetic field to control a state of the particle in the substrate; and
   a top coat layer disposed over the particles and the substrate.

14. The assembly of claim 13, wherein the pockets are formed in the polymer film by laser ablation.

15. The assembly of claim 13, wherein the assembly substrate is formed using the polymer film as a mold.

16. The assembly of claim 13, wherein the assembly substrate comprises the polymer film.

17. The assembly of claim 13, further comprising a first dielectric fluid disposed in at least some of the pockets of the assembly substrate, the first dielectric fluid having a different color than the particles.

18. The assembly of claim 17, wherein the first dielectric fluid is disposed in a first subset of the pockets, a second dielectric fluid is disposed in a second subset of the pockets, and the first dielectric fluid has a different color than the second dielectric fluid.

19. An assembly comprising:
   an assembly substrate defining a plurality of pockets;
   a plurality of particles disposed in at least a first subset of the pockets and a second subset of the pockets, wherein, on average, each pocket in the first subset contains at least two of the particles, the particles having a first color and being responsive to an applied electromagnetic field to control a position of the particles within the pocket;
   a first dielectric fluid disposed in at least the first subset of the pockets, the first dielectric fluid having a second color different from the first color; and
   a second dielectric fluid disposed in at least the second subset of the pockets, the second dielectric fluid having a third color different from the first and second colors.

20. The assembly of claim 19, wherein each pocket in the first subset contains at least twenty-five particles.

21. The assembly of claim 19, further comprising a second subset of particles, wherein the second subset of particles have a third color different from the first and second colors and are disposed in the second subset of the pockets.

22. The assembly of claim 21, further comprising a second dielectric fluid disposed in the second subset of pockets, the second dielectric fluid having a fourth color different from the second and third colors.

23. The assembly of claim 19, further comprising a second subset of particles disposed in at least the first subset of pockets, the second subset of particles having a third color different than the first and second colors.

24. The assembly of claim 19, wherein the assembly forms a display medium in which the particles are configured and arranged to move in response to an applied electromagnetic field to provide selective reflection of light illuminating the assembly.

25. The assembly of claim 19, wherein the plurality of pockets is divided into at least three subsets, each subset having appropriately colored particles and fluid disposed therein to form a full color display.

26. A method of making an assembly comprising steps of:
   irradiating a polymer film to remove a portion of the polymer film by ablation and produce a plurality of pockets in the polymer film;
   forming, using the polymer film, an assembly substrate with a plurality of pockets corresponding to the plurality of pockets in the polymer film;
   disposing particles in the plurality of pockets of the assembly substrate, wherein each of the particles is configured and arranged to move in response to an applied electromagnetic field to control a state of the particle in the substrate; and
   disposing a top coat layer over the particles and at least a portion of the assembly substrate.

27. The method of claim 26, wherein the step of forming an assembly substrate comprises using the film with the plurality of pockets as the assembly substrate.

28. The method of claim 26, wherein the step of forming an assembly substrate comprises using the film as a mold for forming a assembly substrate with a plurality of pockets.

29. The method of claim 26, wherein the step of using the film as a mold comprises disposing a polymer composition over the polymer film to form an assembly substrate with a plurality of pockets.

30. The method of claim 26, wherein the step of using the film as a mold comprises
   forming a second mold by disposing a composition on the polymer film, the second mold having a plurality of projections corresponding to the plurality of pockets of the film, and
   forming the assembly substrate by disposing a second composition on the second mold, the assembly substrate having a plurality of pockets corresponding to the plurality of projections of the second mold.

* * * * *

UNITED STATES PATENT AND TRADEMARK OFFICE
CERTIFICATE OF CORRECTION

PATENT NO. : 6,462,859 B1
DATED : October 8, 2002
INVENTOR(S) : Bastiaens, Willem V.

It is certified that error appears in the above-identified patent and that said Letters Patent is hereby corrected as shown below:

Column 10,
Line 4, after "line", delete "in".

Column 11,
Line 61, delete "film The" and insert in place thereof -- film. The --.

Column 12,
Line 24, after "over", delete "the".

Column 13,
Line 52, delete "techniques" and insert in place thereof -- technique --.

Column 14,
Line 29, delete "electromagnetic." and insert in place thereof -- electromagnetic --.

Signed and Sealed this

Nineteenth Day of August, 2003

JAMES E. ROGAN
*Director of the United States Patent and Trademark Office*